United States Patent
Donovan et al.

(10) Patent No.: US 6,440,222 B1
(45) Date of Patent: Aug. 27, 2002

(54) SUGAR BEET MEMBRANE FILTRATION PROCESS

(75) Inventors: Michael Donovan, Great Dunmow (GB); Robert P. Jansen, Chevy Chase, MD (US); Richard C. Reisig, Scottsbluff, NE (US); Marc Hlavacek, London (GB); Gordon Walker, Reading (GB); John C. Williams, Wokingham (GB)

(73) Assignees: Tate & Lyle Industries, Limited, London (GB); Tate & Lyle, Inc., Decatur, IL (US)

( * ) Notice: Subject to any disclaimer, the term of this patent is extended or adjusted under 35 U.S.C. 154(b) by 72 days.

(21) Appl. No.: 09/618,831

(22) Filed: Jul. 18, 2000

(51) Int. Cl.[7] .............................. C13D 1/08; C13D 3/08; C13D 3/10; C13D 3/14; C13D 3/16

(52) U.S. Cl. .................... 127/55; 127/43; 127/46.2; 127/48; 127/52; 127/54; 127/56

(58) Field of Search .................... 127/43, 46.2, 48, 127/52, 54, 55, 56

(56) References Cited

U.S. PATENT DOCUMENTS

| | | |
|---|---|---|
| 1,578,463 A | 3/1926 | Nicholson et al. |
| 1,815,276 A | 7/1931 | Schwieger |
| 2,164,186 A | 6/1939 | Brown et al. ................. 127/50 |
| 2,557,800 A | 6/1951 | Seailles ........................ 127/52 |
| 2,697,049 A | 12/1954 | Brieghel-Müller ........... 127/50 |

(List continued on next page.)

FOREIGN PATENT DOCUMENTS

| | | |
|---|---|---|
| CZ | 107886 | 7/1963 |
| DE | 813139 | 9/1951 |
| DE | 942552 | 5/1956 |
| DE | 1 003 150 | 8/1957 |
| EP | 0 126 512 | 11/1984 |

(List continued on next page.)

OTHER PUBLICATIONS

PCT/US00/22301, International Search Report (May 29, 2001).

Nielsen et al., "Prospects and Possibilities in Application of Membrane Filtration Systems Within the Beet and Cane Sugar Industry," *Sugar Technology Reviews* 9:59–117 (1982), No Month Provided.

(List continued on next page.)

*Primary Examiner*—David Brunsman
(74) *Attorney, Agent, or Firm*—Williams, Morgan & Amerson, P.C.

(57) ABSTRACT

A process for producing sugar from beets includes the step of filtering a sucrose-containing feed juice, which has been obtained from macerated sugar beets, through a first ultrafiltration membrane that has a first molecular weight cutoff. This ultrafiltration step produces a first ultrafiltration permeate and a first ultrafiltration retentate. The first ultrafiltration permeate is filtered through a second ultrafiltration membrane that has a second molecular weight cutoff that is lower than the first molecular weight cutoff. This second ultrafiltration step produces a second ultrafiltration permeate and a second ultrafiltration retentate. The second ultrafiltration permeate is nanofiltered through a nanofiltration membrane, thereby producing a nanofiltration permeate and a nanofiltration retentate. The nanofiltration retentate has a higher concentration of sucrose on a dry solids basis than the feed juice in step (a), and can be used in evaporation and crystallization operations to produce crystals of white sugar. The process can optionally include ion exchange and/or electrodialysis purification steps, prior to or after the nanofiltration step. Recycle syrups can be treated with enzyme or a chromatographic separator to remove raffinose.

50 Claims, 2 Drawing Sheets

U.S. PATENT DOCUMENTS

| | | | |
|---|---|---|---|
| 2,801,940 A | 8/1957 | Stark et al. | 127/44 |
| 2,824,028 A | 2/1958 | Zenzes | 127/50 |
| 2,977,253 A | 3/1961 | Grandadam | 127/50 |
| 3,113,044 A | 12/1963 | Alston | 127/48 |
| 3,168,419 A | 2/1965 | Gale | 127/50 |
| 3,926,662 A | 12/1975 | Rundell et al. | 127/48 |
| 4,057,437 A | 11/1977 | Kracklauer | 127/9 |
| 4,115,147 A | 9/1978 | Shimizu et al. | 127/54 |
| 4,328,043 A * | 5/1982 | Freytag et al. | 127/44 |
| 4,332,622 A * | 6/1982 | Hohnerlein, Jr. | 127/41 |
| 4,432,806 A * | 2/1984 | Madsen et al. | 127/48 |
| 4,478,645 A * | 10/1984 | Gudnason | 127/57 |
| 4,702,839 A * | 10/1987 | Koerts et al. | 210/638 |
| 4,716,044 A * | 12/1987 | Thomas et al. | 426/51 |
| 4,795,494 A * | 1/1989 | Toth et al. | 127/48 |
| 5,145,584 A * | 9/1992 | Swamikannu | 210/650 |
| 5,254,174 A * | 10/1993 | Hansen et al. | 127/53 |
| 5,281,279 A * | 1/1994 | Gil et al. | 127/46.1 |
| 5,320,681 A * | 6/1994 | Moe et al. | 127/46.1 |
| 5,403,604 A * | 4/1995 | Black, Jr. et al. | 426/330.5 |
| 5,454,952 A * | 10/1995 | Brewer | 210/651 |
| 5,466,294 A * | 11/1995 | Kearney et al. | 127/42 |
| 5,468,300 A * | 11/1995 | Monclin | 127/43 |
| 5,468,301 A * | 11/1995 | Monclin | 127/43 |
| 5,480,490 A * | 1/1996 | Toth et al. | 127/42 |
| 5,554,227 A * | 9/1996 | Kwok et al. | 127/58 |
| 5,685,990 A * | 11/1997 | Saugmann et al. | 210/650 |
| 5,747,089 A * | 5/1998 | Ljusberg et al. | 426/478 |
| 5,759,283 A * | 6/1998 | Ekern et al. | 127/42 |
| 5,902,408 A * | 5/1999 | Player et al. | 27/30 |
| 5,902,409 A * | 5/1999 | Kwok et al. | 127/58 |

FOREIGN PATENT DOCUMENTS

| | | | |
|---|---|---|---|
| EP | 0126512 | * 11/1984 | C13D/1/10 |
| EP | 0957178 A2 | 11/1999 | |
| GB | 477312 | 3/1936 | |
| GB | 1 361 674 | 7/1974 | |
| WO | WO92/08810 | 5/1992 | |
| WO | WO92/10948 | 7/1992 | |
| WO | WO93/07766 | 4/1993 | |
| WO | WO98/24331 | 6/1998 | |

OTHER PUBLICATIONS

Kishihara et al., "Improvement of Flux in Ultrafiltration of Cane Juice," *Int. Sugar Jnl.* 85:99–102 (1983), No Month Provided.

Hanssens et al., "Ultrafiltration as an Alternative for Raw Juice Purification in the Beet Sugar Industry" (17th General Assembly of C.I.T.S., Copenhagen 1983), No Month Provided.

"Membrane Filtration," *Food Engineering* (Nov. 1987).

"Purification Using Membrane Filtration," *Sugar Journal* (Nov. 1994).

Abram et al., "Sugar Refining: Present Technology and Future Developments," *Sugar: Science and Technology,* Chapter 3, pp. 49–95 (1979), No Month Provided.

Kort, "Colour in the Sugar Industry," *Sugar: Science and Technology,* Chapter 4, pp. 97–130 (1979), No Month Provided.

Reinefeld, "Progress in the Technology of Beet–Sugar," *Sugar: Science and Technology,* Chapter 5, pp. 131–149 (1979), No Month Provided.

Chen, "Outline of Process for Manufacturing Raw Cane Sugar," *Cane Sugar Handbook,* Chapter 2, pp. 47–105, 127–186 and 526–559 (1985), No Month Provided.

Lancrenon et al., "Mineral Membranes for the Sugar Industry," *Sugar yAzucar*, pp. 40–45 (1993), No Month Provided.

Hartmann, "Lime and Carbon Dioxide Production," *Beet–Sugar Technology,* Chapter XVII, pp. 567–593 (1982), No Month Provided.

Toth, "The Wescot Juice Purification System" (1989 ASSBT Meeting, New Orleans, Louisiana, Feb. 26–Mar. 2, 1989).

"Beet Sugar Process," Western Sugar, No Date Provided.

Derwent Abstract, DD 136455 (1979), No Month Provided.
Derwent Abstract, DE 3229345 (1984), No Month Provided.
Derwent Abstract, EP 635578 (1995), No Month Provided.
Derwent Abstract, EP 655507 (1995), No Month Provided.
Derwent Abstract, RU 2016637 (1994), No Month Provided.
Derwent Abstract, JP 5004929 (1993), No Month Provided.
Derwent Abstract, JP 6287199 (1994), No Month Provided.
Derwent Abstract, SU 1669984 (1991), No Month Provided.
Derwent Abstract, NL 8800175 (1989), No Month Provided.
Derwent Abstract, FR 2586360 (1987), No Month Provided.
Derwent Abstract, US 4999116 (1991), No Month Provided.
Derwent Abstract, RU 2016637 (1994), No Month Provided.
Derwent Abstract, JP 5004929 (1993), No Month Provided.
Derwent Abstract, DE 3229345 (1984), No Month Provided.
Derwent Abstract, US 5008254 (1991), No Month Provided.
Derwent Abstract, JP 6287199 (1994), No Month Provided.
Derwent Abstract, SU 1756817 (1992), No Month Provided.
Derwent Abstract, SU 1669984 (1991), No Month Provided.
Derwent Abstract, WO 9208810 (1992), No Month Provided.
Derwent Abstract, NL 8800175 (1989), No Month Provided.
Derwent Abstracr, FR 2586360 (1987), No Month Provided.
Derwent Abstract, DE 3229345 (1984), No Month Provided.
Derwent Abstract, DD 136455 (1979), No Month Provided.

Freeman, "New Processes for Recovering Sugar from Sugar Beets," *Sugar* 48:161–162 (1953), No Month Provided.

Dorfeldt, "Manufacture of Sugar from Rasped Beets," *Zeitschrift Zuckerindustrie* 2:379–383 (1952), No Month Provided.

Brownell et al., "Explosion Process for Recovering Sugar from Sugar Beets," *Sugar,* p. 66 (1952), No Month Provided.

Cheryan, "Membrane Separation Processes and Their Use in Purifying or Concentrating Liquid Food Systems," *Activity Report, Research and Development Associates for Military Food and Packaging Systems* 44:164–181 (1992), No Month Provided.

Urano et al., "Separation Properties for Oligosaccharides of Nanofiltration Membranes and Its Application to a Purification Process of Jerusalem Artichoke Oligosaccharides," *Nippon Shokuhin Kagaku Kogaku Kaishi* 44:457–462 (1997), No Month Provided.

Madsen, "New Developments in the Purification of Beet Sugar," *Int. Sugar Jnl.* 92:221–223 (1990), No Month Provided.

Saska et al., "Direct Production of White Cane Sugar with Clarification and Decolorization Membranes—Part I," *Sugar Journal* 58:19–21 (1995), No Month Provided.

Saska et al., "Direct Production of White Cane Sugar with Clarification and Decolorization Membranes—Part II," *Sugar Journal* 58:29–31 (1995), No Month Provided.

Saska et al., "Concentration and Decolorization of Dilute Products from Cane Molasses Desugarization with Reverse Osmosis and Nanofiltration Membranes," 1994 Sugar Industry Technologists Meeting, Honolulu, Hawaii (May 8–11, 1994).

Cartier et al., "Development Actuel et Potentiel Des Procédés A Membranes en Sucrerie et Raffinerie De Canne," *Ind. Alim. Agr. Juillet/Aoōt,* pp. 557–560 (1996) No Month Provided.

Spengler et al., "Experiments on Raw Juice Extraction, Using a Continuously Operating Diffusor from Harburger Olewerke Brinckman & Mergell," *Ztschr. Wirtschaftsgruppe Zuckerind* 91:275–333 (1941) No Month Provided.

Müller, "Extraction of Raw Juice According to the Steckel Process," *Zeitschrift fur die Zuckerindustrie,* pp. 207–209 (1961), No Month Provided.

"Desugarization of Sugar Beet Mash" No Date Provided.

Dörfeldt, "Raw Juice Extract from Beet Pulp," *Zuckerindustrie: Fachorgan für Technik, Rübenbau und Wirtschaft* 2:379–383 (1952), No Month Provided.

Schneider, "Beet Comminution," *Technologie des Zuckers,* pp. 135–136, 171 (excepts) (1968), No Month Provided.

* cited by examiner

SUGAR BEET MEMBRANE FILTRATION PROCESS

BACKGROUND OF THE INVENTION

The present invention relates to a process for obtaining sucrose from sugar beets.

The conventional beet sugar manufacturing process involves cleaning the beets, slicing them into cossettes, extracting juice from the cossettes by diffusion, purifying the juice by liming and carbonation, concentrating the juice by multiple effect evaporation, multi-stage boiling of concentrated juice in pans, separation, washing, and drying the sugar.

Juice extraction in the conventional process is done by allowing the sugar to diffuse through the natural cell walls of beets. The cell walls allow sugars and other low molecular weight compounds to pass through but prevent the passage of high molecular weight compounds. This selective diffusion process has two advantages. Retaining the high molecular weight compounds helps produce a high purity juice. It also reduces filtration difficulties that are caused by polysaccharides and proteins that comprise the high molecular weight compounds.

Purification of beet juice in the conventional process is based on lime treatment. Lime serves many purposes in the juice purification process. It neutralizes the acidity of the juice and precipitates calcium salts of several organic and inorganic acids. The precipitate absorbs other impurities. The lime precipitate produces a porous mass, which facilitates subsequent filtration of juice.

The conventional diffusion process for juice extraction from beets has some disadvantages. It has a long retention time, which encourages microbial growth, resulting in sugar loss and formation of undesirable compounds. It is difficult to increase the temperature of sliced cossettes quickly enough to prevent growth of micro-organisms. Typically the pulp remaining after diffusion is pressed and the press juice is introduced back into the diffuser. A significant portion of the high molecular weight compounds retained by the cell walls in the diffusion process is released in pressing to be mixed with the diffusion juice. This partially negates the advantages of the selective diffusion process.

The conventional liming process uses large quantities of lime, amounting to about 2.5% of the total weight of beets processed. Beet sugar plants operate lime kilns and transport limestone over long distances for this purpose. The effluent from the liming-carbonation process, consisting of used lime and separated impurities, is disposed as waste. Production of lime and disposal of liming effluent are costly operations. Disposal of liming effluent is becoming increasingly difficult and expensive in many communities.

Conventional dead-end filtration is incapable of separating sucrose from macromolecular impurities in beet juice. Several methods of using microfiltration and ultrafiltration for purification of juice with reduced lime use have been reported, but these methods generally involve inserting microfiltration or ultrafiltration membranes into the conventional beet process at one or more points.

There is a long-standing need for improved processes for obtaining sugar from beets that avoid or at least minimize one or more of the problems existing in the previously used processes.

SUMMARY OF THE INVENTION

The present invention relates to a process for producing sugar from beets. A sucrose-containing feed juice that has been obtained from sugar beets is filtered through a first ultrafiltration membrane that has a first molecular weight cutoff. This ultrafiltration step produces a first ultrafiltration permeate and a first ultrafiltration retentate. The first ultrafiltration permeate is filtered through a second ultrafiltration membrane that has a second molecular weight cutoff that is lower than the first molecular weight cutoff. This second ultrafiltration step produces a second ultrafiltration permeate and a second ultrafiltration retentate. The second ultrafiltration permeate is nanofiltered through a nanofiltration membrane, thereby producing a nanofiltration permeate and a nanofiltration retentate. The nanofiltration retentate has a higher concentration of sucrose on a dry solids basis than the feed juice introduced into the first ultrafiltration step, and can be used in evaporation and crystallization operations to produce crystals of white sugar.

In one embodiment of the invention, the sucrose-containing feed juice is manufactured by macerating sugar beets or pieces thereof, thereby producing a macerated material that comprises pulp and liquid, and then separating the liquid in the macerated material from the pulp, for example by one or more of centrifugation, conventional filtration, or screening. In one particular embodiment, the beets are macerated by first passing them through a hammer mill, and optionally they can subsequently be passed through a grinder, whereby the beets are converted into a mixture of pulp and sucrose-containing liquid. Preferably, no more than about 5% by weight of the sucrose present in the beets remains in the pulp after the liquid is separated therefrom, more preferably no more than about 3%.

After separation of the fibrous pulp from the liquid, and before the first ultrafiltration, the process can optionally include an additional step or steps to remove residual beet fibers and silt from the separated liquid (juice). This can be done by screening and/or filtration. Preferably the screening or filtration removes at least 90% by weight of all fibers and silt having a largest dimension of about 150 μm or greater, more preferably at least 90% by weight of all fibers and silt having a largest dimension of about 50 μm or greater.

It is also possible to introduce air into the feed juice prior to the first ultrafiltration, in order to oxidize color-forming materials. This oxidation, while increasing the color of the juice, causes the color-forming materials to polymerise, which facilitates their removal in the subsequent ultrafiltration. (When this patent refers to polymerisation of color-forming materials, this is intended to include physical agglomeration as well as chemical polymerisation.) Another option is to introduce hydrogen peroxide, ozone, or both, into the feed juice prior to the first ultrafiltration. These materials also facilitate oxidation.

It is preferred to adjust the pH of the feed juice to about 6–8, for example by the addition of a base, prior to ultrafiltration. This can help minimize formation of invert.

The first ultrafiltration membrane preferably has a molecular weight cutoff of at least about 2,000 daltons and a pore size no greater than about 0.1 microns. More preferably, it has a molecular weight cutoff of about 4,000–200,000 daltons. The first ultrafiltration permeate preferably has a color of about 3,000–10,000 icu. (All color values given herein are determined on an ICUMSA scale.)

The process of the present invention can be operated at a number of different process conditions. As representative examples of such conditions, the feed juice can be at a temperature of about 140–200° F. during the first ultrafiltration, more preferably about 160–185 ° F.

The second ultrafiltration membrane preferably has a molecular weight cutoff of about 500–5,000 daltons, more preferably about 1,000–4,000 daltons. In one particular embodiment of the process, the second ultrafiltration is performed in two stages, the first stage using an ultrafiltration membrane having a molecular weight cutoff of about 3,500–4,000 daltons, and the second stage using an ultrafiltration membrane having a molecular weight cutoff of less than about 3,500 daltons. The second ultrafiltration permeate preferably has a color no greater than about 4,000 icu, more preferably no greater than about 2,500 icu.

In order to minimize loss of sucrose in the retentate from the first and second ultrafiltration steps, it is preferable to include diafiltration steps in the process. "Diafiltration" is used herein to mean ultrafiltration that employs added water in the feed to help flush sucrose through the membrane.

In one such embodiment of the process, the first ultrafiltration retentate is diafiltered through at least a first diafiltration/ultrafiltration membrane. This produces a first diafiltration permeate and a first diafiltration retentate. The first diafiltration permeate is then combined with the first ultrafiltration permeate and filtered through the second ultrafiltration membrane.

Similarly, the retentate from the second ultrafiltration can be diafiltered through at least a second diafiltration/ultrafiltration membrane. This second diafiltration step produces a second diafiltration permeate and a second diafiltration retentate. The second diafiltration permeate is then combined with the second ultrafiltration permeate and subsequently filtered through the nanofiltration membrane.

The retentates from the first and second ultrafiltrations (or diafiltrations) and the nanofiltration permeate can be combined to produce molasses. This combined stream may need to be concentrated by evaporation of water.

In addition to purification of the juice by nanofiltration, it is possible to include in the process ion exchange and/or electrodialysis purification steps. These three purification methods can be used in any sequence. In one particularly preferred embodiment of the process, the nanofiltration retentate is purified by electrodialysis, thereby producing a electrodialyzed juice and an electrodialysis residue, and then the electrodialyzed juice is purified by ion exchange, thereby producing a purified juice. Preferably, no lime and no carbon dioxide are contacted with any of the permeates.

The nanofiltration removes ash (including mono- and divalent cations), invert, organic acids, nitrogenous material and other low molecular weight organic or charged compounds. The nanofiltration and the optional electrodialysis and/or ion exchange preferably remove at least about 65% by weight of the Ca, Mg, K, Na and their associated inorganic and organic anions that are present in the second ultrafiltration permeate. The ion exchange replaces remaining divalent cations such as calcium and magnesium with monovalent cations such as potassium and sodium. Preferably, the nanofiltration retentate has a lower concentration of divalent cations on a dry solids basis than the second ultrafiltration permeate.

The nanofiltration permeate will contain a large percentage of the impurities that were present in the feed juice. For example, in many instances, the nanofiltration permeate will comprise at least about 30% by weight on a dry solids basis of the ash, at least about 30% of the invert, and at least about 25% of the betaine present in the feed juice.

The purified juice (i.e., after nanofiltration and any electrodialysis and/or ion exchange), preferably has an ash concentration of no greater than about 2.5% by weight on a dry solids basis, more preferably no greater than about 2%, most preferably no greater than about 1.0%.

After the membrane filtration steps (and any electrodialysis and/or ion exchange), water can be evaporated from the purified juice to produce a concentrated syrup (e.g., 75% dry solids). White sugar can then be crystallized from the concentrated syrup. Because of the high degree of removal of impurities, the present invention can achieve two crystallizations of white sugar from the concentrated syrup, as opposed to one in typical prior art beet processes.

A mother liquor will remain after one or more crystallizations of white sugar from the concentrated syrup. This mother liquor can be recycled to one of the ultrafiltrations. Optionally, this recycle stream can be further purified to reduce its raffinose content.

The process can optionally include sulfitation of one or more process streams. In particular, at least one aqueous stream selected from the group consisting of the feed juice, the first ultrafiltration permeate, the second ultrafiltration permeate, the nanofiltration retentate, and the evaporator feed can be contacted with an agent selected from the group consisting of sulfur dioxide, sulfite salts, bisulfite salts, metabisulfite salts, dithionites, and mixtures thereof, in an amount sufficient to provide an equivalent concentration of sulfur dioxide in the stream of at least about 100 ppm.

One particularly preferred embodiment of the invention is a process for producing sugar from beets that comprises the steps of:

(a) macerating sugar beets or pieces thereof, thereby forming pulp that comprises sucrose-containing aqueous liquid;

(b) separating the sucrose-containing liquid from the pulp;

(c) filtering the sucrose-containing liquid through a first ultrafiltration membrane that has a molecular weight cutoff of about 4,000–200,000 daltons, thereby producing a first ultrafiltration permeate that has a color no greater than about 10,000 icu and a first ultrafiltration retentate;

(d) filtering the first ultrafiltration permeate through a second ultrafiltration membrane that has a molecular weight cutoff of about 2,000–4,000 daltons, thereby producing a second ultrafiltration permeate that has a color no greater than about 4,000 icu and a second ultrafiltration retentate;

(e) filtering the second ultrafiltration permeate through a nanofiltration membrane; thereby producing a nanofiltration permeate and a nanofiltration retentate, wherein the nanofiltration retentate has a higher concentration of sucrose on a dry solids basis than the sucrose-containing liquid in step (b);

(f) purifying the nanofiltration rententate by at least one method selected from the group consisting of ion exchange and electrodialysis, thereby producing an evaporator feed;

(g) evaporating water from the evaporator feed to produce a concentrated syrup; and (h) crystallizing white sugar from the concentrated syrup.

Optionally, this embodiment of the process can further comprise the steps of:

(i) crystallising a mother liquor from the first crystallisation to produce white sugar;

(j) treating the mother liquor from the second crystallisation by chromatographic separation or by an enzyme to remove raffinose; and (k) recycling the treated mother liquor back to the nanofiltration feed or the evaporator feed.

Another aspect of the present invention is a process for purifying a sucrose-containing juice obtained from sugar beets. This process comprises the steps of: (a) introducing sufficient air into the juice to cause polymerisation of color bodies; and (b) removing at least some of the color bodies from the juice by membrane filtration through at least one ultrafiltration membrane or nanofiltration membrane.

The various aspects of the present invention have a number of advantages over prior art beet processes. For example, the process of the present invention eliminates the need for a lime kiln, lime quarries and all associated equipment, processes, products, by-products and waste products. Also, the present invention results in a drastic reduction of waste products that cause environmental pollution. The conventional process produces a filter cake that comprises products of the liming process and impurities removed from the juice. This cake is disposed into ponds or landfills. The proposed process completely eliminates the need for disposal of such materials. The present invention allows elimination of the carbonation process, which is a major source of atmospheric pollution in beet sugar plants.

The present invention provides a cost-effective way of reducing the ash content of the beet juice or syrup, preferably to about 2% or less (on a dry solids basis), more preferably to about 1.5% or less, most preferably to about 1% or less. This reduction in ash content is important because it allows a second strike of sucrose crystals from the syrup. In prior art beet processes, ash contents in the range of 3.5% made it practically impossible to have more than one strike of sucrose crystals.

In addition, the present invention can eliminate the need for desugarization of molasses streams. The efficient membrane filtration steps prevent excessive amounts of sucrose from entering the molasses streams in the first place.

Further, the present invention provides an economical and reliable method for removing color-causing materials from beet juice. It also can reduce the formation of undesirable crystalline forms due to the presence of excessive amounts of raffinose.

DETAILED DESCRIPTION OF SPECIFIC EMBODIMENTS

Figure 1:
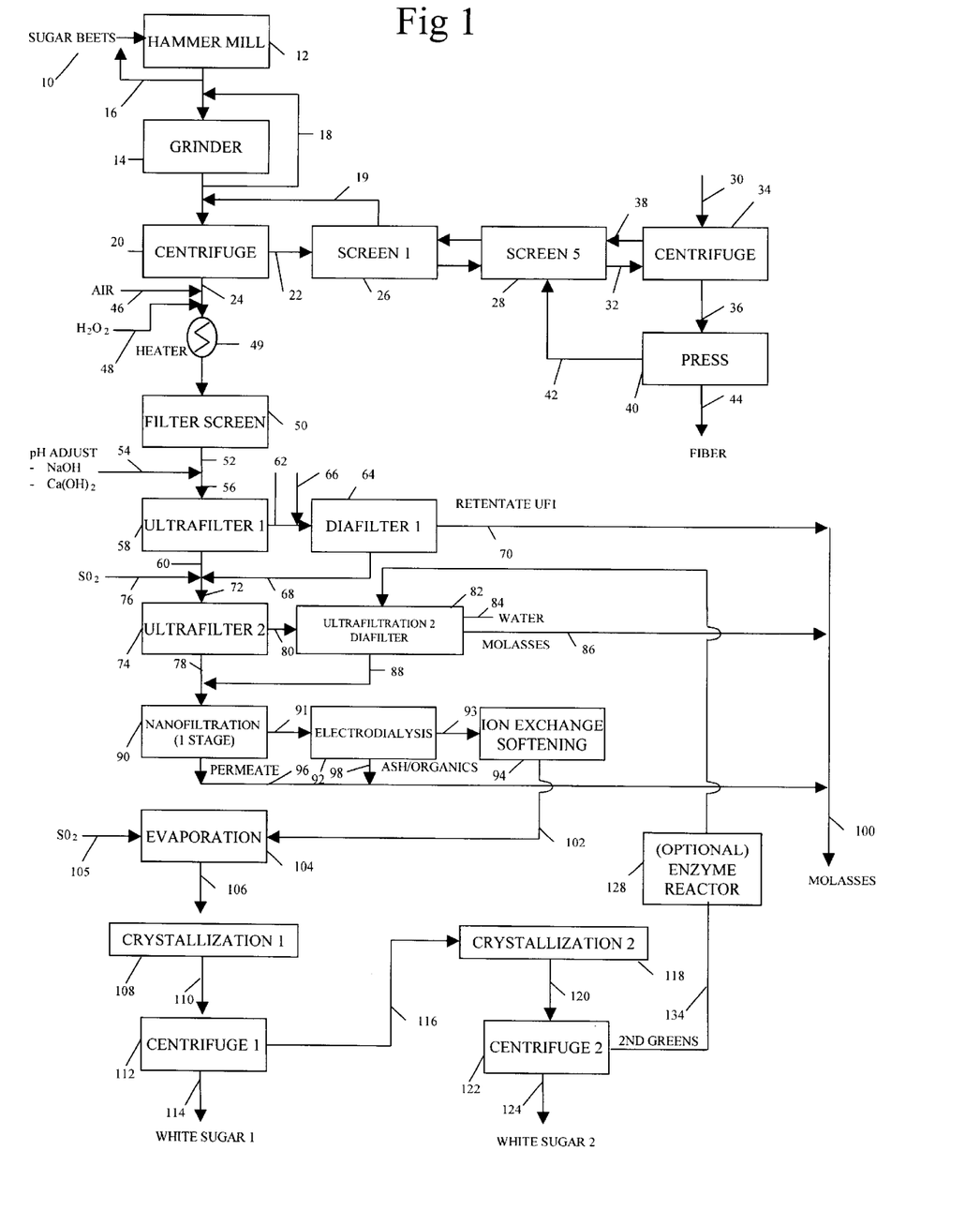
FIGS. 1 and 2 are a process flow diagrams showing embodiments of the present invention in which sucrose is obtained from sugar beets.

The present invention provides an improved method for obtaining sucrose from sugar beets. Although the process of the present invention can be operated in batch mode, it is especially well suited for continuous operation. One embodiment of the invention is shown in FIG. 1. Beets received from the field are kept in a storage area 10. Fresh beets are typically used in the process, but frozen beets can also be used. Beets from the storage area are flumed in a conventional beet washing apparatus, in which dirt is removed from the exterior of the beets.

Optionally, the washed beets can be sliced into cossettes (e.g., having a thickness of about ¼ inch) prior to being macerated. However, in the embodiment shown in FIG. 1, the beets are not sliced.

The washed beets are carried by conveying apparatus to macerating apparatus. The macerating apparatus can comprise, for example, one or more hammer mills 12 and one or more grinders 14. Suitable hammer mills can use a set of swinging blades mounted on a vertical shaft, which force the beet material through a discharge screen. Another suitable type of hammer mill uses fixed blades. Another suitable macerating apparatus comprises one or more attrition mills that use discs as the primary attrition device. The discs preferably have grooves therein to facilitate maceration, and the discs can be horizontal or vertical in positioning. It is also possible to use both disc mills and hammer mills in series (e.g., hammer mill followed by disc attrition mill) or to have only one type of mill, a hammer mill.

Partially macerated beets exiting the hammer mill 12 can be passed through the grinder 14, in which the beet material is further macerated. The macerated material leaving the grinder comprises pulp (i.e., fibrous material from the beets) and aqueous liquid that contains sucrose as well as other substances. Juice side streams 16 and 18 can be taken from the output of the hammer mill 12 and the grinder 14 and recycled into the feed to those devices. This increases the flow of liquid through the hammer mill 12 and the grinder 14 and helps carry along the solid portion of the beets.

The macerated material leaving the grinder 14 is passed through a separator 20 for separation of the liquid from the fibrous pulp. The separator 20 can suitably be a centrifuge, filter, or screen (e.g., a rotating or vibrating screen, or a Dorr-Oliver DSM screen), or a combination of two or more of these. In the embodiment of the process shown in FIG. 1, the separator 20 comprises a centrifuge, which produces a pulp stream 22 and a juice stream 24. The pulp is passed through a series of screens 26 and 28, with a counter-current flow of aqueous liquid helping to remove residual sucrose from the pulp. These can be rotating, vibrating screens, or DSM screens. The counter-current flow is established by introducing a water stream 30 into a centrifuge 34 at the other end of the series of screens. The pulp stream 32 exiting the final screen 28 then passes into the centrifuge 34, in which it is separated into a low-water pulp material 36 and a recovered juice 38, with the latter being routed in counter-current flow to the pulp through the series of screens 28 and 26. This centrifuge 34 desweetens the pulp. A liquid 19 can be drawn from one of the screens, usually the first screen, and fed into the juice stream before the centrifuge 20. Optionally anti-foam can be added to the juice and fiber streams to reduce foaming.

The low water pulp 36 has some of its remaining water and sucrose removed in a press 40. The aqueous stream 42 from the press 40 is recycled into one of the screens 28. The residual fiber 44 that remains after pressing can be used as animal feed.

The juice stream 24 exiting the centrifuge 20 can optionally have an air stream 46 injected into it. This will oxidize color-forming materials in the juice (e.g., resulting in a color increase from 8,000 to 16,000), which aids in the formation of polymerised color bodies and thereby facilitates removal of the color bodies in the subsequent ultrafiltration. It is also possible to inject a stream 48 of hydrogen peroxide solution, in addition to or instead of injecting air. The hydrogen peroxide also assists oxidation and polymerisation of color-forming materials. Alternatively, ozone could be injected in place of hydrogen peroxide. The temperature of the juice is preferably increased at this point in the process by a heater 49, preferably to about 140–200° F., more preferably about 160–185° F.

Optionally, the heated juice can be pre-filtered prior to the first ultrafiltration, in order to reduce its already low fiber content. The pre-filtration can be done, for example, with a rotating or vibrating screen 50. Preferably, the filter or screen 50 has a mesh size of about 30–100 microns, and removes the majority by weight of the fiber and silt remaining in the juice.

The heated and screened juice 52 can optionally have its pH adjusted by addition of a stream 54 that comprises, for example, aqueous sodium hydroxide, calcium hydroxide, or potassium carbonate. This pH adjustment helps prevent the inversion of sugars which can take place at elevated temperatures. Other chemicals may be also be used for pH adjustment, such as liquid potassium hydroxide or granular sodium or potassium carbonate. Preferably the pH of the juice after this step is between about 6.0–8.0, more preferably between about 6.5–7.5.

The juice after the pH adjustment, referred to herein as the ultrafiltration feed juice 56, is brought into contact with a first ultrafiltration membrane 58. This first ultrafiltration membrane is preferably tubular or spiral and preferably has a molecular weight cutoff of at least about 2,000 daltons and a pore size no greater than about 0.1 microns, more preferably having a molecular weight cutoff between about 4,000–500,000 daltons, most preferably between about 10,000–200,000.

The ultrafiltration step produces a first ultrafiltration permeate 60 and a first ultrafiltration retentate 62. In this embodiment of the process, the first ultrafiltration retentate 62 is then fed to a first ultrafiltration/diafiltration membrane 64 with addition of water 66. This ultrafiltration/diafiltration membrane can suitably have a pore size/molecular weight cutoff that is approximately the same as the first ultrafiltration membrane 58. This first diafiltration 64 produces a first diafiltration permeate 68 and a first diafiltration retentate 70 (also referred to as the molasses 1 stream). The diafiltration minimizes the amount of sucrose lost in the molasses (i.e., the concentration of sucrose on a dry solids basis (dsb) is lower in the retentate 70 than in the feed 62). It should be understood that there could be several stages of ultrafiltration 58 and/or diafiltration 64.

The first ultrafiltration permeate 60 typically will have a color of about 3,000–10,000 icu. The first ultrafiltration permeate 60 and the first diafiltration permeate 68 are combined to form the feed 72 for a second ultrafiltration membrane 74.

Prior to the second ultrafiltration, a sulfitation stream 76 can be injected into the juice 72. This stream 76 can comprise, for example, sulfur dioxide, or sulfite, bisulfite, metabisulfite, or dithionite salts, such as aqueous ammonium bisulfite or sodium bisulfite (e.g., at about 35–65% concentration). Preferably, the residual level of sulfur dioxide in the juice after sulfitation is at least about 100 ppm. The sulfitation can take place at one or more points in the process, for example, at the time of slicing or macerating the beets, in the juice after it is separated from the pulp, in the feeds to the first or second ultrafiltrations or to the nanofiltration, and/or in the feed to the evaporator. Most preferably, the sulfitation is done in the feed to the second ultrafiltration. This sulfitation will prevent the color increase that can otherwise take place during membrane filtration and evaporation operations. Other antioxidants may also be used, as well as anti-foaming agents.

The second ultrafiltration membrane 74 preferably has a molecular weight cutoff of about 500–5,000, more preferably about 2,000–4,000. The second ultrafiltration produces a second ultrafiltration permeate 78 and a second ultrafiltration retentate 80. The retentate 80 is then mixed with second greens 134, the mother liquor recycled from the second white sugar crystallisation, and passed through a second ultrafiltration/diafiltration membrane 82 with added water 84. The membrane used for the second diafiltration can suitably have a pore size/molecular weight cutoff that is lower in pore size than the second ultrafiltration membrane 74. This is to remove raffinose and a membrane with a pore size in the range 500–1,000 daltons is preferred. This step produces a second diafiltration permeate 88, which is mixed with the second ultrafiltration permeate 78 and fed to a nanofilter 90, and a second diafiltration retentate 86 (also referred to as the molasses 2 stream). There could be more than one stage of membrane filtration in the second ultrafiltration 74 and/or the second diafiltration 82. The permeate 78 from the second ultrafiltration preferably will have color in the range of 1,500–3,500, or in some cases even less.

Optionally, the second diafiltration permeate 88 and/or the first diafiltration permeate 68 can be recycled into the diafiltration water streams.

Figure 2:
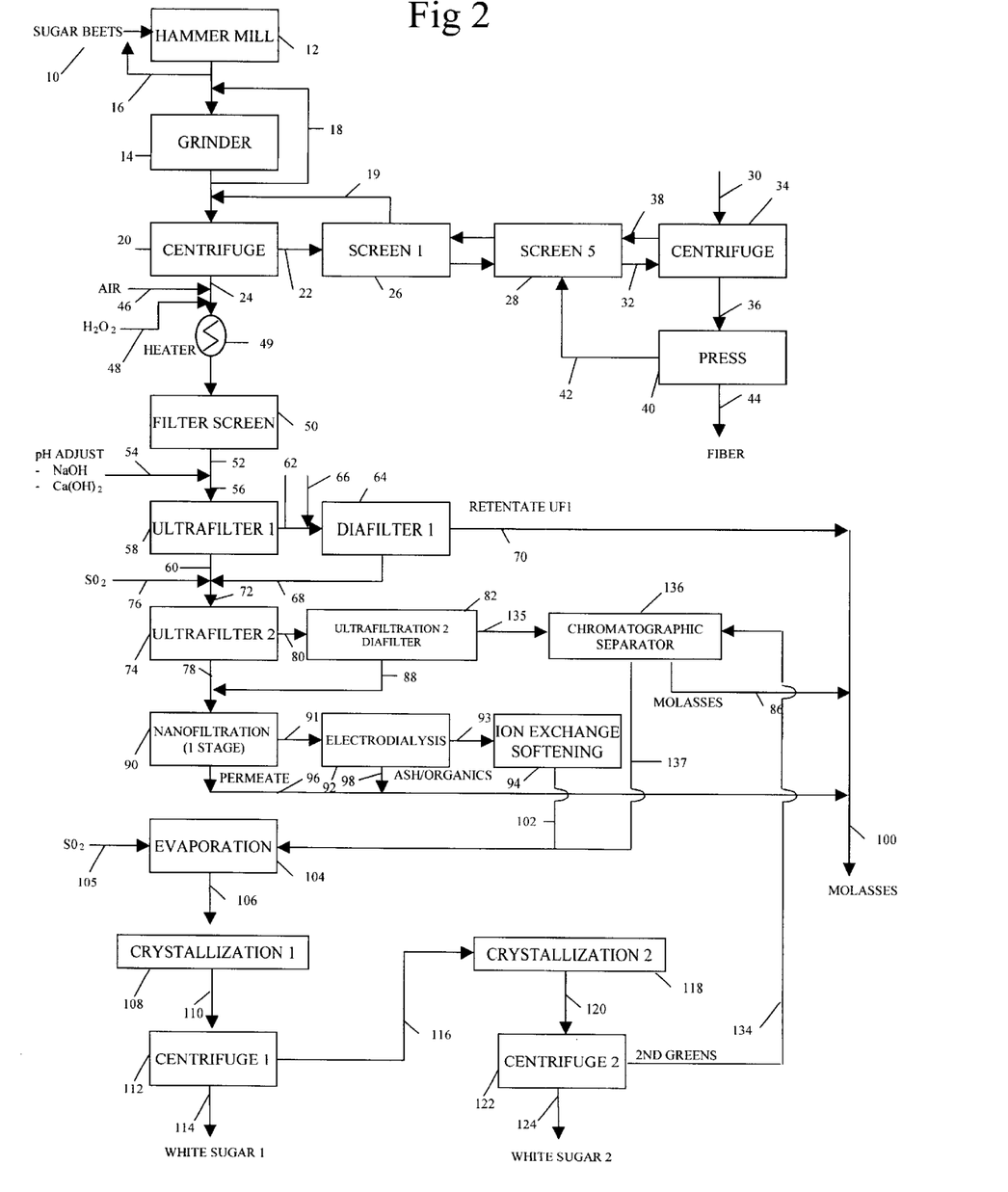

Alternatively, or in addition to ultrafiltration/diafiltration, the retentate can be purified by a chromatographic separation in a simulated moving bed separator system. This is shown in FIG. 2. This chromatographic separator 136 preferably is a multistage unit with from three to twenty stages, more preferably ten stages. It preferably has three product cuts, one being predominantly sucrose, stream 137, another being predominantly raffinose and ash, and the third being predominantly organic material including organic acids. The two non-sucrose streams can be mixed to give stream 86 (referred to as molasses 2). The resin used in the separator preferably is a strong acid cationic resin. The sucrose stream 137 is mixed with the feed to the evaporator. Alternatively, it could be added to the feed of the electrodialysis 92, or to the ion exchange 94, depending on the degree of removal of impurities.

The second ultrafiltration permeate 78 is then purified by nanofiltration, and optionally also ion exchange and/or electrodialysis, in any sequence. In the embodiment shown in FIG. 1, the ultrafiltered juice 78 is first nanofiltered 90, followed by electrodialysis 92 and ion exchange softening 94. Although the sequence of these three operations can be varied, it is usually preferable to perform electrodialysis after nanofiltration.

The feed to the nanofiltration membrane typically comprises about 84% sucrose, 3–6% ash, and about 0.5–4.0% invert sugar (all by weight on dsb). The nanofiltration membrane 90 separates the feed into a nanofiltration permeate 96 (also referred to as the molasses 3 stream) and a nanofiltration retentate 91 which will contain most of the sucrose from the beets. The nanofiltration permeate preferably contains at least about 30–60% by weight of the ash (primarily Na, K, and Cl), at least about 30–50% by weight of the invert (glucose and fructose), and at least about 25–50% by weight of the betaine present in the nanofiltration feed 78. The nanofiltration will accomplish some color reduction from the nanofiltration feed to the retentate. A typical nanofiltration permeate will comprise 20% sucrose, 25% ash, 20% invert, 8% betaine and 25% other organics (dsb). Preferably, the nanofiltration retentate 91 will contain at least about 89–91% by weight (dsb) sucrose and will have a concentration of about 15–28 Brix. Although nanofiltration can effectively remove potassium, it does not remove a large percentage of the citric, oxalic, and malic acid that is present.

The nanofiltration retentate 91 is then further purified by electrodialysis 92, which removes additional ash and various organic acids and other impurities, including some that cause undesirable color. Electrodialysis provides good removal of oxalic acid and malic acid, with the total ash removal typically being over 40%. The impurity stream 98 from the electrodialysis is combined with the streams 70, 86, and 96, to form a molasses product stream 100.

Although electrodialysis can achieve good removal of potassium, it does not typically remove a high percentage of the magnesium that is present. Therefore, the purified juice 93 from electrodialysis (which will typically contain about 92–94% sucrose dsb) preferably is then softened by ion exchange unit 94 which contains at least one ion exchange resin. A strong cation exchange resin based on a gel or macro-porous matrix, with cross-linking ranging from 4 to 10%, is preferred. Examples of these are resins such as Rohm & Haas Amberlite IR120, or Purolite C 100. These will be used in the sodium or potassium form. The primary purpose of this step is to remove divalent cations, such as Ca and Mg, and replace them with monovalent cations, such as K and Na. This ion exchange step preferably removes at least about 95% by weight of the Ca and Mg present.

The purified juice 102 from the ion exchange, which preferably comprises more than about 92% sucrose (dsb), is then fed to one or more evaporators 104, in which a concentrated syrup 106 is formed (e.g., about 75% dry solids) by removal of substantial quantities of water. Optionally, a sulfitation stream 105 can be injected into the evaporator. Preferably, the syrup 30 will have a pH of about 6.5–7.5 and a temperature of about 160–180° F. during evaporation.

The concentrated syrup 106 is fed to a first crystallizer 108, in which water is boiled off and a first strike of white sugar crystals 110 is formed. The crystals 110 are centrifuged 112, washing with a water spray, to remove any residual liquid, and the remaining product is white sugar 114 (sucrose concentration of about 99.95%). The mother liquor 116 remaining after the first crystallization and centrifugation (typically containing about 84–88% sucrose dsb) is fed to a second crystallizer 118, in which a second strike of white sugar crystals 120 is formed. The crystals are also centrifuged 122 to produce white sugar 124. In prior art beet processes, the crystals produced in the second crystallizations were dissolved and recycled into the feed, because they were not pure enough to sell as white sugar. The present invention can achieve two strikes of highly pure white sugar, due to its improved purification capabilities. In a preferred embodiment, the crystallized sucrose (114 and 124) will comprise less than about 0.015% by weight ash, more preferably less than about 0.01% ash, and a color less than 35 iu.

The mother liquor 134 remaining after the second crystallization (also referred to as "greens" or "jets", and typically containing about 80% sucrose dsb) can be recycled, for example into the second ultrafiltration/diafiltration 82. Optionally, this greens recycle stream may be routed through a purification unit to remove raffinose. This purification can be done by chromatographic separation of raffinose (see FIG. 2) (also resulting in dilution of the greens to about 60 Brix), or alternatively by enzymatic digestion of raffinose 128 (see FIG. 1). Preferably, if this purification 128 is included in the process, the raffinose concentration in the greens is decreased to a level no greater than about 1.0% dsb. The enzyme used to hydrolyse raffinose is α-galactosidase (melibiase), splitting raffinose into sucrose and galactose. This can be carried out in a batch fashion in a stirred tank reactor at 50° C.

The process of the present invention can include multiple stages of ultrafiltration, nanofiltration, diafiltration, ion exchange, and/or electrodialysis. For example, the first ultrafiltration shown in FIG. 1 could take place in two or more stages of ultrafiltration, rather than taking place through a single membrane. Those skilled in the art will recognize that many other variations on the specific embodiment shown in the figure are also possible. It should also be recognized that the process can be operated at a variety of temperatures and other process conditions.

A variety of membrane configurations can be used in the present invention, including for example spiral, hollow fiber, and tubular membranes. These membranes can be made from a various materials including polymers, ceramics, carbon and sintered stainless steel. Membranes that have a negative surface charge are preferred since most compounds to be rejected are negatively charged.

Some of the equipment used in the process is conventional and well known to persons of ordinary skill in this field, such as beet washing equipment and evaporators. Beet macerating apparatus is commercially available from suppliers such as Bepex Reitz (Santa Rosa, Calif.), Andriz Sprout Bauer (Philadelphia, Pa.) and The Fitzpatrick Company (Elmhurst, Ill.). Centrifugal extraction apparatus is available from Dorr Oliver (Milford, Conn.), Western States Machine Company (Hamilton, Ohio), and Silver-Weibull (Hasslehom, Sweden). Suitable membrane filtration systems are available from suppliers such as Koch Membrane Systems, Inc. (Wilmington, Mass.), Osmonics, Inc. (Minnetonka, Minn.), PCI (UK), and SCT (France). Suitable ion exchange equipment and resins are available from Prosep (Roscoe, Ill.), IWT (Rockford, Ill.), Purolite (Philadelphia, Pa.), and Dow Chemical (Midland, Mich.). Suitable electrodialysis equipment is available from Eurodia (Paris, France) and Ameridia (Somerset, N.J.). Suitable enzymes for digestion of raffinose are available from Novo (Denmark) or Hokkaido Sugar Co (Japan).

It would also be possible to include in the process a treatment with some amount of lime and/or carbonation. However, it is presently preferred to operate the process without contacting the feed juice or any of the permeates with either lime or carbon dioxide in order to carry out carbonation. Lime or carbon dioxide can be added as bases.

EXAMPLE 1a

Sliced beets (cossettes) were fed to a Rietz Disintegrator hammer mill at 420 kg/hour, and from there to an Andriz Sprout-Bauer grinder to provide a well macerated pulp. This fiber and juice was passed to the first centrifuge, a Mercone manufactured by Dorr-Oliver which was fitted with a 150 micron conical screen. The system was maintained at a temperature of 65–70° C. and the juice out of the first centrifuge was at 13–14 RDS.

The macerated beet fiber stream from the first centrifuge was fed to a system of 50 micron screens operating in a counter current fashion, and finally to a second Mercone centrifuge fitted with a 250 micron screen. This second centrifuge desweetened the fiber providing a residual beet fiber contained 5.7% sugar and 88% water. Juice was recycled from the second centrifuge and counter-current through the system of screens to the first centrifuge at 3–5 gallons/minute. About 250 ppm on beets of antifoam oil (KABO 580) was added to the juice, while hot water was fed to the second centrifuge at 1 gallon/minute. The juice was adjusted to 70° C., pH adjustment was carried out by adding sodium hydroxide solution to the maceration stage, and the final juice was pH trimmed as necessary. The final juice from the macerated beets was at 13.2 RDS (refractometric dry solids) and pH 6.4 (measured at ambient temperature). The apparent purity (Pol/Brix) was 82.6; conductivity ash 3.9% and color 29,900 icu. It contained 0.6% fiber.

EXAMPLE 1b

The juice from Example 1a, at about 70° C., was fed to the first ultrafiltration. This was a PCI 12 foot membrane module with tubular elements having a molecular weight cut off of 200 k Daltons, and a surface area of 2.7 m². The inlet pressure averaged 100 psi, the outlet 63 psi, and the cross flow rate was 537 liters/minute. The permeate flow rate was 2.6 liters/minute (corresponding to 60 Liters/square meter/hour). The permeate was 11.0 RDS; pH 6.5; apparent purity 83.8; color 4705 icu, and ash 4.9%. The retentate was 11.1 RDS; 74.4 apparent purity; 5.1% ash and 60,800 icu color. A similar membrane in series diafiltered the retentate with 1.0 liters/minute of water and delivered a further 1.9 liters/minute of permeate at 8 RDS.

EXAMPLE 1c

The permeate from the first ultrafiltration system was fed at about 70° C. to a second ultrafiltration system which comprised two 4 inch spiral Osmonics GN membranes having a molecular weight cut off of 3,500 Daltons, with a surface area of 12 square meters. The inlet pressure averaged 65 psi, the outlet 50 psi. The total permeate flow rate averaged 1.4 liters/minute giving 7 Liters/square meter/hour. The permeate was 8.6 RDS; pH 7.0; apparent purity 83.6; color 1666 icu, and conductivity ash 4.9% (5.4% sulphated ash). The retentate was 14.2 RDS; 83.3 apparent purity; conductivity ash 5% and 13,800 icu color.

EXAMPLE 1d

The permeate from the second ultrafiltration membrane was passed over a cation exchange resin (Purolite C155S) in the sodium form. The flow was 2.4 liters/minute and this was passed over 90 liters of resin at 1.6 Bed volumes/hour and at 70° C. The product was 7.1 RDS, at pH 6.4, the apparent purity was 83.5; color 1505 icu, and conductivity ash 5.6% (5.2% sulphated ash). The ionic composition of the resin input and output streams was:

|  | Ca | Mg | K | Na | Cl | PO4 | SO4 | Oxalate |
| --- | --- | --- | --- | --- | --- | --- | --- | --- |
| Feed | 0.003% | 0.085% | 0.97% | 0.91% | 0.49% | 0.28% | 0.091% | 0.44% |
| Product | 0.001% | 0.038% | 0.87% | 1.000% | 0.52% | 0.30% | 0.089% | 0.37% |

EXAMPLE 1e

The resin product stream was treated by nano filtration with 3 stages of Desal 5 DL membranes. The total membrane surface was 18 square metres, and the inlet pressure 450 psi, and temperature 65° C. The feed flow was 2.6 liters min and the retentate flow 1.0 liters min. Diafiltration water was introduced between the stages at 0.3 liters/min.

The retentate (product) stream was 25.4 RDS; 88.3 apparent purity; color 1154 icu and 2.9% ash. The permeate was 1.8 RDS; 12.0 apparent purity; 3083 color and about 20% ash. By HPLC the composition of the streams (% on dry solids) was:

|  | Sucrose | Glucose | Fructose | Raffinose | Betaine |
| --- | --- | --- | --- | --- | --- |
| Feed | 82.9 | 0.22 | 0.75 | 0.52 | 1.83 |
| Permeate | 18.7 | 0.63 | 3.62 | 0.09 | 7.11 |
| Retentate | 89.3 | 0.11 | 0.31 | 0.63 | 1.18 |

EXAMPLE 1f

The product stream from the nano filtration was evaporated to give a syrup at 70.5 Brix. Approximately 1 ml/minute of ammonium bisulfite (ABS) solution was added to the feed juice to the evaporator. The ABS was a 65% stock solution diluted 1:1. The evaporator was a single effect APV plate and frame unit, and was operated at 8 psia and the syrup temperature was about 85° C. The feed flow rate was litre/minute at 25.4 brix.

The liquor produced by the evaporator was crystallized under vacuum to give white sugar with color 10.2 icu and a conductivity ash of 0.009%. The crystallisation was carried out in batch mode, in a crystalliser containing 50 liters of massescuite. The crystalliser was a pilot unit manufactured by Pignat of Genas, France. Crystallisation pressure and temperature were 20 in Hg abs and 70–75° C. and crystallisation took 2 hours. The massecuite formed by crystallisation was centrifuged on a 2 foot basket centrifuge using a perforated basket. The mother syrup (separated by centrifugation) had an apparent purity of 81.8% and a color of 2988 icu.

EXAMPLE 2

(Alternative Ion Exchange Treatment)

A second ultrafiltration stage UF2 similar to that described in example 1c above but comprising two 4 inch spiral Osmonics GN (MWCO 3500 Daltons) and two 4 inch spiral Osmonics GM membrane (MWCO 3000 Daltons) modules was used to treat juice from a first stage of ultrafiltration. This juice was originally derived from macerated beets as described above. The modules ran at input pressures averaging 160 and 250 psi respectively and delivered an overall 2.5 liters min of permeate (pH 6.5, 9 RDS and 1890 color). The permeate was treated with a cation exchange resin (Purolite PCR) in the potassium form at 70° C. and 0.9 Bed Volumes/hour. The product was at pH 7.0, 8.9 RDS, 85.1 purity and 1959 color. The input and output compositions (% on dry solids) were:

|  | Ca | Mg | K | Na | Ash |
| --- | --- | --- | --- | --- | --- |
| Resin feed | 0.006% | 0.158% | 1.14% | 0.67% | 5.4% |
| Resin product | 0.006% | 0.003% | 3.39% | 0.06% | 7.8% |

EXAMPLE 3

(Electrodialysis)

The product from the ion exchange resin in the potassium form in EXAMPLE 2 was treated by nano filtration (operated as in Example 1e above). The product (retentate) was 23 RDS, 89.5% purity (by HPLC), 4.5% as sulphated ash and 1800 icu color. It was treated by electrodialysis in a stack comprising 40 cationic/anionic membrane pairs; each pair had 0.1 m² of membrane surface. The membranes used were manufactured by Tokuyama Corp of Japan, the anion membrane was AE506sb, and the cation membrane was CMXsb. The stack operated at 45–545° C.; with 18–30 volts and a current of 2–3 amps. The anolyte and catholyte systems contained dilute sulphamic acid (20 mS/cm conductivity) which circulated through the stack at 3 gpm. The stream being treated circulated at 8–10 gpm, and flowed through the whole system at about 1 litre/minute. The concentrate stream was 0.5% sodium chloride solution. The electrodialysed product stream was at 94.4% purity (by HPLC) and had 2.2% sulphated ash (calculated from the cation composition as shown below where the ionic composition of the feed and product streams is expressed as % ions on solids.

|  | Ca | Mg | K | Na | Ash |
|---|---|---|---|---|---|
| Feed | 0.002% | 0.009% | 1.86% | 0.104% | 4.5% |
| Product | 0.001% | 0.003% | 0.88% | 0.079% | 2.2% |

The product from this experiment was evaporated and crystallised to white sugar as in Example 1f. On evaporation (in the presence of ammonium bisulphite sufficient to give the 280 ppm of residual $SO_2$) the product was at 70 RDS and 1700 icu color. Crystallisation under vacuum yielded a white sugar with a color of 17 icu and a conductivity ash of 0.007%. The mother syrup (separated by centrifugation) had an apparent purity of 84% and 4560 icu color.

Example 4

Juice from the beet maceration system, as described in Example 1a, was filtered in a spiral ultrafiltration membrane. It was first pre-filtered through a 200 micron bag filter to remove any fibers that had passed through the centrifuge screen. The membrane used was a 4 inch Osmonics JY spiral having a membrane area of 4.8 square meters and a cut off of 100,000 D. The temperature of the juice was 140° F. (60° C.) and the inlet and outlet pressures were 50 psi and 30 psi respectively. The feed rate was 3.6 liters per minute, and permeate and retentate flows were both 1.8 liters per minute at 13 and 14.2 RDS respectively, giving a flux rate of 22.5 liters/square meter/hour at a concentration factor of ×2. The feed color was 1232 iu and the permeate color was 6475 iu. This juice can be further processed to white sugar using steps 1c, 1d, 1e, and 1f.

Example 5

The juice comprising a mixture of the mother liquor from white sugar crystallisations and the retentate from a second ultrafiltration can be evaporated to 60 RDS and passed at a rate of 0.9 liters/hour over a simulated moving bed separating system, containing 5.8 liters of resin distributed among 10 cells. Water can be injected at 4 liters per hour and the system operated at a temperature of 70° C. Three fractions can be collected from the system containing respectively, most of the organics; most of the sucrose; and most of the raffinose plus other organic materials. Typical properties of each of these fractions are given in the tables below. ("Organics" represent materials calculated by difference from the analytical results.)

|  | Flow l/hour | RDS | Sucrose | Invert | Ash | Raffinose | Organics | Colour iu |
|---|---|---|---|---|---|---|---|---|
| Feed | 0.9 | 60 | 66.6 | 4.0 | 5.9 | 8.2 | 15.3 | 33,000 |
| Organic fraction | 0.7 | 1.1 | 13.2 | 9.8 | 16 | 0.0 | 61 | 29,700 |

|  | Flow l/hour | RDS | Sucrose | Invert | Ash | Raffinose | Organics | Colour iu |
|---|---|---|---|---|---|---|---|---|
| Sucrose fraction | 1.84 | 29.3 | 96.0 | 0.7 | 0.2 | 3.1 | 0.0 | 6090 |
| Raffinose fraction | 2.5 | 8.4 | 13.7 | 9.8 | 16.6 | 20.4 | 39.5 | 90,300 |

The sucrose fraction obtained can be 96% pure and represent a recovery of 92.5% of the sucrose input.

Example 6

450 gms of the mother syrup from the first crystallisation of white sugar (at about 75 RDS, and containing 2.3% raffinose on solids) was diluted to 30 RDS with water. The pH was adjusted to 5.0 by adding dilute sulphuric acid and the solution temperature brought to 50° C. $2.5 \times 10^7$ units of pelleted α-galactosidase enzyme were added (12.2 gm) and the solution stirred at 50° C. for 2 hours. The resulting juice contained 0.7% raffinose on solids.

Example 7

The mother syrup from the crystallisation of a first strike of white sugar (color 3147 icu at 83.1% apparent purity) was crystallised under vacuum to give a second crop of white sugar with color 20 icu and a conductivity ash of 0.01%. The crystallisation was carried out in batch mode in a crystalliser containing 50 liters of massecuite. The crystalliser was a pilot unit manufactured by Pignat of Genas, France. Crystallisation pressure and temperature were 20 inch Hg abs and 70–75° C., and crystallisation took about 2 hours. The massecuite formed by crystallisation was centrifuged on a 2 foot basket centrifuge using a perforated basket. The mother syrup (separated by centrifugation) had an apparent purity of 81.1% and a color of 4155 icu.

The preceding description of specific embodiments of the present invention is not intended to be a complete list of every possible embodiment of the invention. Persons skilled in this field will recognize that modifications can be made to the specific embodiments described here that would be within the scope of the present invention.

What is claimed is:

1. A process for producing sugar from beets, comprising the steps of:
   (a) macerating sugar beets or pieces thereof, thereby producing a macerated material that comprises pulp and liquid,
   (b) separating the liquid in the macerated material from the pulp at a temperature of at least about 65° C. to produce a sucrose-containing feed juice;
   (c) filtering the sucrose-containing feed juice through a first ultrafiltration membrane that has a first molecular weight cutoff, thereby producing a first ultrafiltration permeate and a first ultrafiltration retentate;
   (d) filtering the first ultrafiltration permeate trough a second ultrafiltration membrane that has a second molecular weight cutoff that is lower than the first molecular weight cutoff; thereby producing a second ultrafiltration permeate and a second ultrafiltration retentate; and
   (e) filtering the second ultrafiltration permeate through a nanofiltration membrane; thereby producing a nanofiltration permeate and a nanofiltration retentate, wherein the nanofiltration retentate has a higher concentration of sucrose on a dry solids basis than the feed juice in step (c).

2. The process of claim 1, further comprising the step of purifying either the second ultrafiltration permeate or the nanofiltration retentate by at least one method selected from the group consisting of ion exchange and electrodialysis.

3. The process of claim 2, wherein the nanofiltration retentate is purified by electrodialysis, thereby producing a electrodialyzed juice and an electrodialysis residue.

4. The process of claim 3, wherein the electrodialyzed juice is softened by ion exchange, thereby producing a softened purified juice.

5. The process of claim 4, wherein the nanofiltration, electrodialysis, and ion exchange remove at least about 65% by weight of the Ca, Mg, K, Na and their associated inorganic and organic anions that are present in the second ultrafiltration permeate.

6. The process of claim 3, wherein at least two of the first ultrafiltration retentate, the second ultrafiltration retentate, the nanofiltration permeate and the electrodialysis concentrate or residue are combined to produce molasses.

7. The process of claim 4, further comprising evaporating the purified juice to produce a concentrated syrup, and crystallizing white sugar from the concentrated syrup.

8. The process of claim 7, wherein the purified juice has an ash concentration of no greater than about 2.5% by weight on a dry solids basis.

9. The process of claim 8, wherein the purified juice has an ash concentration of no greater than about 2.0% by weight on a dry solids basis.

10. The process of claim 9, wherein the purified juice has an ash concentration of no greater than about 1.0% by weight on a dry solids basis.

11. The process of claim 7, wherein the process comprises two crystallizations of white sugar from the concentrated syrup.

12. The process of claim 7, wherein a mother liquor remains after crystallization of white sugar from the concentrated syrup, and the mother liquor is recycled to one of the ultrafiltration membranes.

13. The process of claim 4, wherein at least one aqueous stream selected from the group consisting of the feed juice, the first ultrafiltration permeate, the second ultrafiltration permeate, the nanofiltration retentate, and the purified juice is contacted with an agent selected from the group consisting of sulfur dioxide, sulfite salts, bisulfite salts, metabisulfite salts, dithionite salts, and mixtures thereof, in an amount sufficient to provide an equivalent concentration of sulfur dioxide in the stream of at least about 100 ppm.

14. The process of claim 1, wherein air is introduced into the feed juice prior to the first ultrafiltration to polymerise color bodies.

15. The process of claim 1, wherein hydrogen peroxide, ozone, or a combination thereof is introduced into the feed juice prior to the first ultrafiltration.

16. The process of claim 1, wherein the pH of the juice is adjusted to about 6–8 by addition of a base, prior to the first ultrafiltration.

17. The process of claim 1, wherein no more than about 5% of the sucrose present in the beets remains in the pulp after liquid is separated therefrom.

18. The process of claim 17, wherein no more than about 3% of the sucrose present in the beets remains in the pulp after liquid is separated therefrom.

19. The process of claim 1, further comprising the step of removing residual beet fibers and silt from the separated liquid, by at least one method selected from the group consisting of screening and filtration, prior to the first ultrafiltration.

20. The process of claim 19, wherein the screening or filtration removes at least 90% by weight of all fibers and silt having a largest dimension of about 150 $\mu$m or greater.

21. The process of claim 20, wherein the screening or filtration removes at least 90% by weight of all fibers and silt having a largest dimension of about 50 $\mu$m or greater.

22. The process of claim 1, wherein the beets are macerated by passing the beets through a hammer mill, whereby the beets are converted into a mixture of pulp and sucrose-containing liquid.

23. The process of claim 22, wherein the macerated beets are also passed through a grinder.

24. The process of claim 22, wherein liquid is separated from the pulp by centrifugation.

25. The process of claim 1, wherein the first ultrafiltration retentate is diafiltered through at least a first diafiltration/ultrafiltration membrane, thereby producing a first diafiltration permeate and a first diafiltration retentate; and wherein the first diafiltration permeate is filtered through the second ultrafiltration membrane.

26. The process of claim 25, wherein the second ultrafiltration retentate is diafiltered through at least a second diafiltration/ultrafiltration membrane, thereby producing a second diafiltration permeate and a second diafiltration retentate; and wherein the second diafiltration permeate is filtered through the nanofiltration membrane.

27. The process of claim 26, wherein at least the first diafiltration retentate, the second diafiltration retentate, and the nanofiltration permeate are combined to produce molasses.

28. The process of claim 1, further comprising evaporating the nanofiltration retentate to produce a concentrated syrup, and crystallizing white sugar from the concentrated syrup.

29. The process of claim 28, wherein a mother liquor remains after crystallization of white sugar from the concentrated syrup, and the mother liquor is recycled to one of the ultrafiltration membranes.

30. The process of claim 1, wherein the feed juice is at a temperature of about 140–200° F. during filtration through the first ultrafiltration membrane.

31. The process of claim 30, wherein the feed juice is at a temperature of about 160–185° F. during filtration through the first ultrafiltration membrane.

32. The process of claim 1, wherein the first ultrafiltration membrane has a molecular weight cutoff of at least about 2,000 daltons and a pore size no greater than about 0.1 microns.

33. The process of claim 32, wherein the first ultrafiltration membrane has a molecular weight cutoff of about 4,000–200,000 daltons.

34. The process of claim 1, wherein the first ultrafiltration permeate has a color of about 3,000–10,000 icu.

35. The process of claim 1, wherein the second ultrafiltration membrane has a molecular weight cutoff of about 500–5,000 daltons.

36. The process of claim 35, wherein the second ultrafiltration membrane has a molecular weight cutoff of about 2,000–4,000 daltons.

37. The process of claim 1, wherein the second ultrafiltration permeate has a color no greater than about 4,000 icu.

38. The process of claim 1, wherein the second ultrafiltration permeate has a color no greater than about 2,500 icu.

39. The process of claim 1, wherein the nanofiltration permeate comprises at least about 30% by weight on a dry solids basis of the ash present in the feed juice.

40. The process of claim 1, wherein the nanofiltration permeate comprises at least about 30% by weight on a dry solids basis of the invert sugars present in the feed juice.

41. The process of claim 1, wherein the nanofiltration permeate comprises at least about 25% by weight on a dry solids basis of the betaine present in the feed juice.

42. The process of claim 1, wherein at least one aqueous stream selected from the group consisting of the feed juice, the first ultrafiltration permeate, the second ultrafiltration permeate, and the nanofiltration retentate is contacted with an agent selected from the group consisting of sulfur dioxide, sulfite salts, bisulfite salts, metabisulfite salts, dithionite salts, and mixtures thereof, in an amount sufficient to provide an equivalent concentration of sulfur dioxide in the stream of at least about 100 ppm.

43. The process of claim 1, where no lime and no carbon dioxide are contacted with any of the permeates.

44. A process for producing sugar from beets, comprising the steps of:
(a) macerating sugar beets or pieces thereof, thereby forming pulp that comprises sucrose-containing aqueous liquid;
(b) separating the sucrose-containing liquid from the pulp at a temperature of at least about 65° C.;
(c) filtering the sucrose-containing liquid through a first ultrafiltration membrane that has a molecular weight cutoff of about 4,000–200,000 daltons, thereby producing a first ultrafiltration permeate that has a color no greater an about 10,000 icu and a first ultrafiltration retentate;
(d) filtering the first ultrafiltration permeate through a second ultrafiltration membrane that has a molecular weight cutoff of about 2,000–4,000 daltons, thereby producing a second ultrafiltration permeate that was a color no greater than about 4,000 icu and a second ultrafiltration retentate;
(e) filtering the second ultrafiltration permeate through a nanofiltration membrane; thereby producing a nanofiltration permeate and a nanofiltration retentate, wherein the nanofiltration retentate has a higher concentration of sucrose on a dry solids basis than the sucrose-containing liquid in step (b);
(f) purifying the nanofiltration retentate by at least one method selected from the group consisting of ion exchange and electrodialysis, thereby producing an evaporator feed;
(g) evaporating water from the evaporator feed to produce a concentrated syrup; and
(h) crystallizing white sugar from the concentrated syrup.

45. The process of claim 44, wherein the process comprises at least two crystallizations of white sugar from the concentrated syrup.

46. The process of claim 44, wherein a mother liquor produced in the crystallization comprises raffinose, and at least 75% by weight of the raffinose is removed from the mother liquor in a simulated moving bed chromatographic separator, and the treated liquor is recycled.

47. The process of claim 46, wherein the recycled liquor is subjected to further purification, evaporation and crystallisation.

48. The process of claim 44, wherein a mother liquor produced in the crystallization comprises raffinose, and at least 75% by weight of the raffinose is removed from the mother liquor using melibiase enzyme, and the treated liquor is recycled to the feed of the second ultrafiltration membrane.

49. A process for purifying a sucrose-containing juice obtained from sugar beets, comprising the steps of:
(a) macerating sugar beets or pieces thereof, thereby forming pulp that comprises sucrose-containing aqueous liquid;
(b) separating the sucrose-containing liquid from the pulp at a temperature of at least about 65° C.;
(c) introducing sufficient air into the juice to cause polymerisation of color bodies;
(d) heating the juice to a temperature of about 140–200° F.; and
(e) removing at least some of the color bodies from the juice by membrane filtration through at least one ultrafiltration membrane or nanofiltration membrane.

50. The process of claim 49, wherein the membrane filtration comprises:
filtering the juice through a first ultrafiltration membrane that has a first molecular weight cutoff, thereby producing a first ultrafiltration permeate and a first ultrafiltration retentate;
filtering the first ultrafiltration permeate through a second ultrafiltration membrane that has a second molecular weight cutoff that is lower than the first molecular weight cutoff; thereby producing a second ultrafiltration permeate and a second ultrafiltration retentate; and
filtering the second ultrafiltration permeate through a nanofiltration membrane; thereby producing a nanofiltration permeate and a nanofiltration retentate.

* * * * *

UNITED STATES PATENT AND TRADEMARK OFFICE
CERTIFICATE OF CORRECTION

| | | |
|---|---|---|
| PATENT NO. | : 6,440,222 B1 | Page 1 of 1 |
| DATED | : August 27, 2002 | |
| INVENTOR(S) | : Michael Donovan, Robert P. Jansen, Richard C. Reisig, Mark Hlavacek, Gordon Walker and John C. Williams | |

It is certified that error appears in the above-identified patent and that said Letters Patent is hereby corrected as shown below:

Column 17,
Line 35, delete "was" and insert -- has --.

Signed and Sealed this

Thirty-first Day of December, 2002

JAMES E. ROGAN
*Director of the United States Patent and Trademark Office*